US010832598B2

(12) United States Patent
Lee et al.

(10) Patent No.: US 10,832,598 B2
(45) Date of Patent: Nov. 10, 2020

(54) LIGHT EMITTING SIGN APPARATUS USING OPTICAL FIBER INCLUDING SOLAR-RESPONSIVE LIGHT SENSORS

(71) Applicant: ALTech Co., Ltd., Daegu (KR)

(72) Inventors: Ki Hoon Lee, Daegu (KR); Sung Su Jo, Daegu (KR)

(73) Assignee: ALTECH CO., LTD., Daegu (KR)

( * ) Notice: Subject to any disclaimer, the term of this patent is extended or adjusted under 35 U.S.C. 154(b) by 19 days.

(21) Appl. No.: 16/402,094

(22) Filed: May 2, 2019

(65) Prior Publication Data
US 2019/0347966 A1 Nov. 14, 2019

(30) Foreign Application Priority Data

May 8, 2018 (KR) .................. 10-2018-0052564

(51) Int. Cl.
*G09F 9/00* (2006.01)
*G09F 9/305* (2006.01)
(Continued)

(52) U.S. Cl.
CPC ............... *G09F 9/305* (2013.01); *E01F 9/20* (2016.02); *F21S 9/035* (2013.01); *F21V 23/0464* (2013.01); *G02B 6/0006* (2013.01); *G02B 6/0008* (2013.01); *H02J 7/0013* (2013.01); *H02J 7/35* (2013.01); *F21W 2111/02* (2013.01); *G09F 2009/3055* (2013.01)

(58) Field of Classification Search
CPC ..... H02J 7/0055; H02J 7/35; H02S 40/30-38; G09F 2009/3055; G09F 9/305; F21V 23/0464; F21S 9/03-037; G02B 6/0005-0008
See application file for complete search history.

(56) References Cited

U.S. PATENT DOCUMENTS 5,430,825 A * 7/1995 Leaman ............... G02B 6/0008
359/900
6,092,318 A * 7/2000 Arie ........................ G09F 9/305
40/547
(Continued)

FOREIGN PATENT DOCUMENTS

CN 202434162 U 9/2012
JP 6-69985 U 9/1994
(Continued)

*Primary Examiner* — Gerald J Sufleta, II
(74) *Attorney, Agent, or Firm* — Lewis Roca Rothgerber Christie LLP

(57) ABSTRACT

A light emitting sign apparatus including an optical fiber includes an outer frame. The outer frame includes an accommodation space having an opened front side. A front panel covers the front side of the outer frame, and includes a plurality of first front emission holes. A light source module is located in the accommodation space and includes at least one light source. A plurality of first front optical fibers have first ends connected to the plurality of first front emission holes and second ends optically coupled to the at least one light source. At least one outer illumination sensor is located in the accommodation space. A plurality of outer optical fibers have first ends connected to the outer emission holes provided in the outer frame and second ends optically coupled to the at least one outer illumination sensor.

17 Claims, 15 Drawing Sheets

(51) Int. Cl.
*E01F 9/20* (2016.01)
*F21S 9/03* (2006.01)
*F21V 23/04* (2006.01)
*F21V 8/00* (2006.01)
*H02J 7/00* (2006.01)
*H02J 7/35* (2006.01)
*F21W 111/02* (2006.01)

(56) References Cited

U.S. PATENT DOCUMENTS

| | | | | |
|---|---|---|---|---|
| 6,195,016 B1* | 2/2001 | Shankle | | G09F 9/305 340/815.42 |
| 6,198,872 B1* | 3/2001 | Lipson | | G02B 6/25 362/555 |
| 6,520,666 B1* | 2/2003 | Beyerlein | | F21V 5/04 362/471 |
| 2002/0186956 A1* | 12/2002 | Lowry | | G09F 9/305 385/147 |
| 2004/0213020 A1* | 10/2004 | Gotfried | | G02B 6/0006 362/576 |
| 2004/0213540 A1* | 10/2004 | Gotfried | | G02B 6/0008 385/147 |
| 2005/0052883 A1* | 3/2005 | Qi | | A47G 33/06 362/555 |
| 2008/0012125 A1* | 1/2008 | Son | | H01L 25/167 257/724 |
| 2010/0219762 A1* | 9/2010 | Brumels | | F21S 8/086 315/158 |
| 2010/0296274 A1* | 11/2010 | Yu | | G09F 13/02 362/183 |
| 2011/0121741 A1* | 5/2011 | Yamamoto | | G09G 3/3406 315/193 |
| 2011/0157880 A1* | 6/2011 | Chen | | F21S 9/037 362/183 |
| 2011/0241620 A1* | 10/2011 | Lin | | H02J 7/0018 320/112 |
| 2012/0154427 A1 | 6/2012 | Sugiyama | | |
| 2013/0227899 A1* | 9/2013 | Yu | | E04B 2/00 52/173.1 |
| 2014/0286039 A1* | 9/2014 | Sigler | | G02B 6/0006 362/555 |
| 2015/0042493 A1* | 2/2015 | McClean | | H05B 45/10 340/907 |
| 2015/0113842 A1* | 4/2015 | Suhr | | G02B 6/0008 40/559 |
| 2015/0124475 A1* | 5/2015 | Suhr | | G09F 23/0066 362/555 |
| 2015/0370007 A1* | 12/2015 | Wells | | G02B 6/0008 362/23.09 |
| 2016/0239092 A1* | 8/2016 | Junuzovic | | G06F 3/017 |
| 2017/0108189 A1* | 4/2017 | Yeh | | G01S 3/7861 |
| 2018/0131313 A1* | 5/2018 | Powell | | G09F 19/22 |
| 2018/0350279 A1* | 12/2018 | Alary | | G02B 6/0021 |
| 2019/0048541 A1 | 2/2019 | Lee et al. | | |
| 2019/0173419 A1* | 6/2019 | Yan | | H02S 40/32 |
| 2019/0181646 A1* | 6/2019 | Fathy | | H02J 3/381 |

FOREIGN PATENT DOCUMENTS

| | | |
|---|---|---|
| JP | 9-197987 A | 7/1997 |
| JP | 10-298935 A | 11/1998 |
| JP | 2010-61250 A | 3/2010 |
| JP | 2012-128209 A | 7/2012 |
| JP | 2013-31321 A | 2/2013 |
| JP | 2013-178740 A | 9/2013 |
| JP | 2013-236545 A | 11/2013 |
| JP | 2016-25688 A | 2/2016 |
| JP | 2017-76492 A | 4/2017 |
| JP | 2017-84397 A | 5/2017 |
| KR | 10-0612473 B1 | 8/2006 |
| KR | 10-0612474 B1 | 8/2006 |
| KR | 10-0612475 B1 | 8/2006 |
| KR | 10-0788986 B1 | 1/2008 |
| KR | 10-0934624 B1 | 1/2010 |
| KR | 10-2010-0026295 A | 3/2010 |
| KR | 10-0972039 B1 | 7/2010 |
| KR | 10-1077921 B1 | 10/2011 |
| KR | 10-1313317 B1 | 4/2013 |
| KR | 10-1324987 B1 | 11/2013 |
| KR | 10-1349203 B1 | 1/2014 |
| KR | 10-1469887 B1 | 12/2014 |
| KR | 10-1511049 B1 | 4/2015 |
| KR | 10-1547680 B1 | 9/2015 |
| KR | 10-2016-0094529 A | 8/2016 |
| KR | 10-1645349 B1 | 8/2016 |
| KR | 10-1743408 B1 | 6/2017 |
| KR | 10-1835819 B1 | 3/2018 |

\* cited by examiner

LIGHT EMITTING SIGN APPARATUS USING OPTICAL FIBER INCLUDING SOLAR-RESPONSIVE LIGHT SENSORS

CROSS-REFERENCE TO RELATED APPLICATION

The present application claims priority under 35 U.S.C. § 119(a) to Korean patent application no. 10-2018-0052564 filed on May 8, 2018 in the Korean Intellectual Property Office, the entire disclosure of which is incorporated herein by reference.

BACKGROUND

1. Technical Field

The present disclosure generally relates to a light emitting sign apparatus using an optical fiber, which can adapt to an environment of road surroundings.

2. Related Art

In general, road sign and guide sign boards for allowing drivers to recognize directions of progress are installed on all roads such as city streets, national highways, and express highways. In particular, a large number of road sign and guide sign boards are installed at intersections and the like on complicated city streets to allow drivers to conveniently drive to their destinations while seeing them with the naked eyes.

The road sign and guide sign boards are various types of sign boards that guide drivers to their destinations and are installed on roads for the purpose of traffic safety. The specific shapes and standards of the road sign and guide sign boards, such as notice sign boards, restriction sign boards, indication sign boards, and subsidiary sign boards, are defined by laws and regulations. The road sign and guide sign boards are installed on not only roads on which vehicles travel but also sidewalks to allow pedestrians to conveniently and easily recognize directions of progress.

Such a road sign board is provided with a reflection paper used for retro-reflection on a board formed of an iron plate, etc. Accordingly, the road sign board provides information to a driver, etc. by reflecting light from a vehicle.

However, the reflection performance of the road sign board is remarkably deteriorated in a phenomenon in which dewdrops are formed on the road sign board due to atmospheric pressure in the occurrence of fog, on a rainy day, at night, or the like. Therefore, the road sign board using the reflection paper does not provide sufficient safety information to the driver, and accordingly, the risk of traffic accidents is increased.

Further, when the reflection paper cannot perfectly perform a reflection function since the lifespan of the reflection paper is shorter than the predicted lifespan, the risk of traffic accidents is considerably increased. When the reflection paper is exposed to ultraviolet light, the durability of the reflection paper is deteriorated, and therefore, the reflection performance of the reflection paper is remarkably deteriorated.

In particular, when the road sign board does not perform its original function in a danger area such as a sharp curve area on a road, a fatal accident frequently occurs. Therefore, the nation may be obligated to compensate an accident victim or insurance company.

In order to solve such problems, a "light emitting sign board using an optical fiber" has been disclosed in the following Patent Document. The light emitting sign board using the optical fiber has excellent durability. In addition, since the light emitting sign board using the optical fiber uses its own light source, the visibility of the light emitting sign board using the optical fiber is very satisfactory as compared with that of the road sign board using the reflection paper.

Patent Document 1 discloses that the light emitting sign board using the optical fiber may be provided with various types of sensors to sense weather conditions. However, Patent Document 1 does not disclose a detailed configuration of each sensor or a method capable of responding to various road surroundings.

Patent Document 1: Korean Registered Patent Publication No. 10-1645349 (Jul. 28, 2016)

SUMMARY

Embodiments provide a light emitting sign apparatus using an optical fiber, which is provided with an extension portion capable of connecting sensors for collecting environmental information of road surroundings.

Embodiments also provide a light emitting sign apparatus using an optical fiber, which can analyze, use, and adapt to the environmental information collected using the sensors.

Embodiments also provide a light emitting sign apparatus using an optical fiber, which can have improved reliability with respect to vibration, impact, etc. even though relatively inexpensive illumination sensors are used.

Embodiments also provide a light emitting sign apparatus using an optical fiber, which can reduce power consumption by determining a light emitting luminance of light sources according to a position or time of the sun, which is estimated using the illumination sensors.

Embodiments also provide a light emitting sign apparatus using an optical fiber, which can extend the lifespan of a battery by maintaining charge/discharge cycles of the battery even in various situations such as a change in light emitting luminance of the light sources, and maximally use power produced by the solar cell.

Embodiments also provide a light emitting sign apparatus using an optical fiber, which is provided with a self-diagnosis system to facilitate management and maintenance.

Embodiments also provide a light emitting sign apparatus using an optical fiber, which is further provided with a fog sensor, a speed sensor, an image sensor, etc., to response environmental information of road surroundings.

In accordance with an aspect of the present disclosure, there is provided a light emitting sign apparatus using an optical fiber, including: an outer frame including an accommodation space having an opened front side; a front panel covering the front side of the outer frame, the front panel including first front emission holes; a light source module located in the accommodation space, the light source module including at least one light source; first front optical fibers having one ends connected to the first front emission holes and the other ends optically coupled to the at least one light source; at least one outer illumination sensor located in the accommodation space; and outer optical fibers having one ends connected outer emission holes provided in the outer frame and the other ends optically coupled to the at least one outer illumination sensor.

The front panel may further include second front emission holes. The light emitting sign apparatus may further include: a front illumination sensor located in the accommodation space; and second front optical fibers having one ends connected to the second front emission holes and the other ends optically coupled to the front illumination sensor.

The light source module may further include a front illumination sensor. The front illumination sensor may be optically coupled to the other ends of the first front optical fibers.

A frame of the light source module may have a barrel shape. The other ends of the first front optical fibers may constitute a binding part as a concentrated bundle to be fitted into the frame of the light source module. The front illumination sensor and the at least one light source may be disposed to face the binding part.

A sensing period of the front illumination sensor and an emission period of the at least one light source may not temporally overlap with each other.

The at least one outer illumination sensor may include a rear illumination sensor, an upper illumination sensor, a left illumination sensor, and a right illumination sensor. The outer emission holes may include rear emission holes, upper emission holes, left emission holes, and right emission holes. The outer optical fibers may include rear optical fibers, upper optical fibers, left optical fibers, and right optical fibers. The rear optical fibers may have one ends connected to the rear emission holes and the other ends optically coupled to the rear illumination sensor. The upper optical fibers may have one ends connected to the upper emission holes and the other ends optically coupled to the upper illumination sensor. The left optical fibers may have one ends connected to the left emission holes and the other ends optically coupled to the left illumination sensor. The right optical fibers may have one ends connected to the right emission holes and the other ends optically coupled to the right illumination sensor.

The light emitting sign apparatus using the optical fiber may further include a controller configured to estimate a position or time of the sun according to illumination intensity measured by each of the front illumination sensor, the rear illumination sensor, the upper illumination sensor, the left illumination sensor, and the right illumination sensor, and determine a light emitting luminance of the at least one light source according to the estimated position or time of the sun.

The light emitting sign apparatus using the optical fiber may further include a solar cell having a positive electrode connected to a first node; a first main battery configured to receive charge power from the first node or supply discharge power to a second node through charge/discharge switches; and a second main battery configured to receive charge power from the first node or supply discharge power to the second node through charge/discharge switches.

The light emitting sign apparatus using the optical fiber may further include: a first sub-battery configured to receive charge power from the first node or supply discharge power to a third node through charge/discharge switches; a second sub-battery configured to receive charge power from the first node or supply discharge power to the third node through charge/discharge switches; and a DC-DC converter located between the second node and the third node.

The light emitting sign apparatus using the optical fiber may further include: a first diode having an anode connected to the first node and a cathode connected to a side of the charge/discharge switches of the first main battery; a second diode having an anode connected to the side of the charge/discharge switches of the first main battery and a cathode connected to the second node; a third diode having an anode connected to the first node and a cathode connected to a side of the charge/discharge switches of the second main battery; and a fourth diode having an anode connected to the side of the charge/discharge switches of the second main battery and a cathode connected to the second node.

The light emitting sign apparatus using the optical fiber may further include: a fifth diode having an anode connected to the first node and a cathode connected to a side of the charge/discharge switches of the first sub-battery; a sixth diode having an anode connected to the side of the charge/discharge switches of the first sub-battery and a cathode connected to the third node; a seventh diode having an anode connected to the first node and a cathode connected to a side of the charge/discharge switches of the second sub-battery; and an eighth diode having an anode connected to the side of the charge/discharge switches of the second sub-battery and a cathode connected to the third node.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
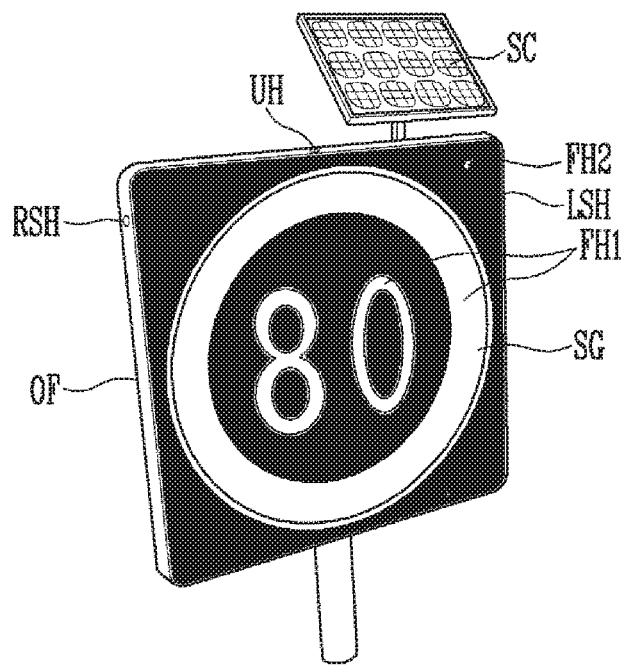
FIGS. 1 and 2 are views illustrating appearances of a light emitting sign apparatus using an optical fiber in accordance with an embodiment of the present disclosure.

Hereinafter, exemplary embodiments are described in detail with reference to the accompanying drawings so that those skilled in the art may easily practice the present disclosure. The present disclosure may be implemented in various different forms and is not limited to the exemplary embodiments described in the present specification.

A part irrelevant to the description will be omitted to clearly describe the present disclosure, and the same or similar constituent elements will be designated by the same reference numerals throughout the specification. Therefore, the same reference numerals may be used in different drawings to identify the same or similar elements.

In addition, the size and thickness of each component illustrated in the drawings are arbitrarily shown for better understanding and ease of description, but the present disclosure is not limited thereto. Thicknesses of several portions and regions are exaggerated for clear expressions.

Figure 2:
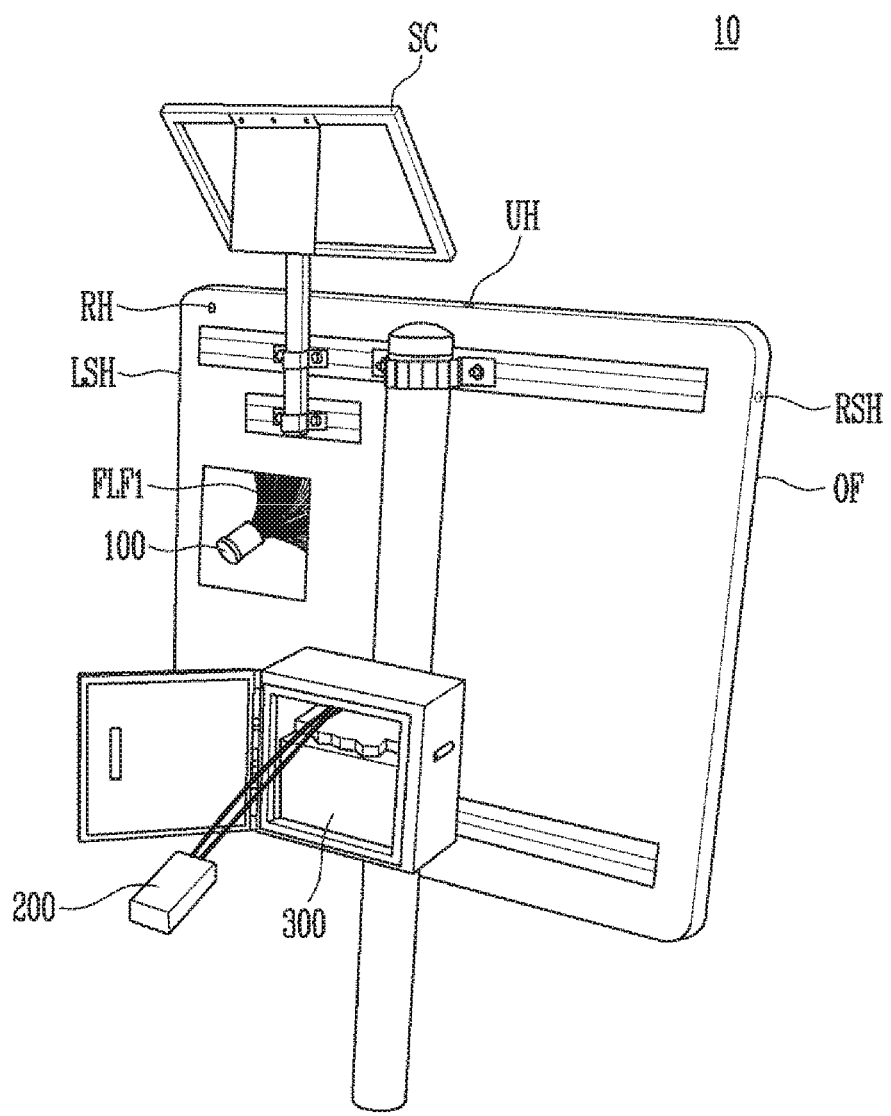

FIGS. 1 and 2 are views illustrating appearances of a light emitting sign apparatus using an optical fiber in accordance with an embodiment of the present disclosure.

Referring to FIGS. 1 and 2, the light emitting sign apparatus 10 using then optical fiber in accordance with the embodiment of the present disclosure includes an outer frame OF, a front panel SG, and a light source module 100. In some embodiments, the light emitting sign apparatus 10 using the optical fiber may selectively further include a solar cell SC, a controller 200, a battery module 300, and the like.

The outer frame OF includes an accommodation space having an opened front side. Hereinafter, the term "outer" means other sides except the front side. The outer frame OF functions to protect electrical devices, optical devices, and the like, which are to be located in the accommodation space, from external impact, etc. The outer frame OF may be made of various materials such as metal and plastic.

The outer frame OF may include outer emission holes. The outer emission holes may include rear emission holes RH, upper emission holes UH, left emission holes LSH, and right emission holes RSH. Corresponding outer optical fibers may be connected to the respective outer emission holes. This will be described in detail with reference to the following drawings from FIG. 3.

The front panel SG covers the front side of the outer frame OF, and includes first front emission holes FH1. The front panel SG may provide road information expressed by at least one of pictures, characters, numbers, and symbols. For example, the first front emission holes FH1 may be located corresponding to the road information. For example, in FIG. 1, the first front emission holes FH1 may be located at number 80 and a circular edge portion.

For example, the front panel SG may be provided in a form in which a substrate, a retro-reflective sheet, and a color sheet are sequentially stacked. The retro-reflective sheet may be located on the entire surface of the substrate, and the color sheet may be partially located on the retro-reflective sheet, corresponding to the road information. The first front emission holes FH1 may be through holes penetrating the substrate, the retro-reflective sheet, and the color sheet.

In this embodiment, a case where the number 80 and the circular edge portion, which correspond to the road information, have the same color will be assumed and described. When the number 80 and the circular edge portion have different colors, color sheets having the different colors may be used. In addition, the first front emission holes FH1 may be divided into two groups according to colors. Each group may be optically connected to a light source module that irradiates light corresponding to a corresponding color. Hereinafter, this description will be omitted.

Second front emission holes FH2 may be located at a portion of the front panel SG. For example, the second front emission holes FH2 may be located in a region of the front panel SG, which is unrelated to the road information. A case where the second front emission holes FH2 are located will be described with reference to FIGS. 3 and 4. However, in some embodiments, the second front emission holes FH2 may not exist (see FIGS. 5 and 6).

The light source module 100 may be located in the accommodation space, and include at least one light source. The light source module 100 will be described in more detail with reference to FIG. 4.

One ends of first front optical fibers FLF1 are connected to the first front emission holes FH1, and the other ends of the first front optical fibers FLF1 are optically coupled to at least one light source of the light source module. The term "the other end of an optical fiber is optically coupled to a light source" means that the light source and the optical fiber are disposed such that light emitted from the light source can be incident onto the other end of the optical fiber. Hereinafter, this description will be omitted.

The solar cell SC may produce power necessary for driving of the light emitting sign apparatus 10 using the optical fiber. The power produced by the solar cell SC may be supplied to the battery module 300 to charge the battery module 300, or be directly supplied as power consumed in the light source module 100.

The battery module 300 may supply power necessary for the driving of the light emitting sign apparatus 10 using the optical fiber. The battery module 300 may include two or more batteries. An electrical connection configuration of the battery module 300 and the solar cell SC will be described in more detail with reference to FIG. 12.

The controller 200 may control power transfer between the light source module 100, the battery module 300, and the solar cell SC. In an embodiment, the controller 200 may estimate a position or time of the sun according to illumination intensity measured by an illumination sensor, and determine a light emitting luminance of the light source according to the estimated position or time of the sun. This will be described in more detail with reference to FIGS. 7 to 11.

Figure 3:
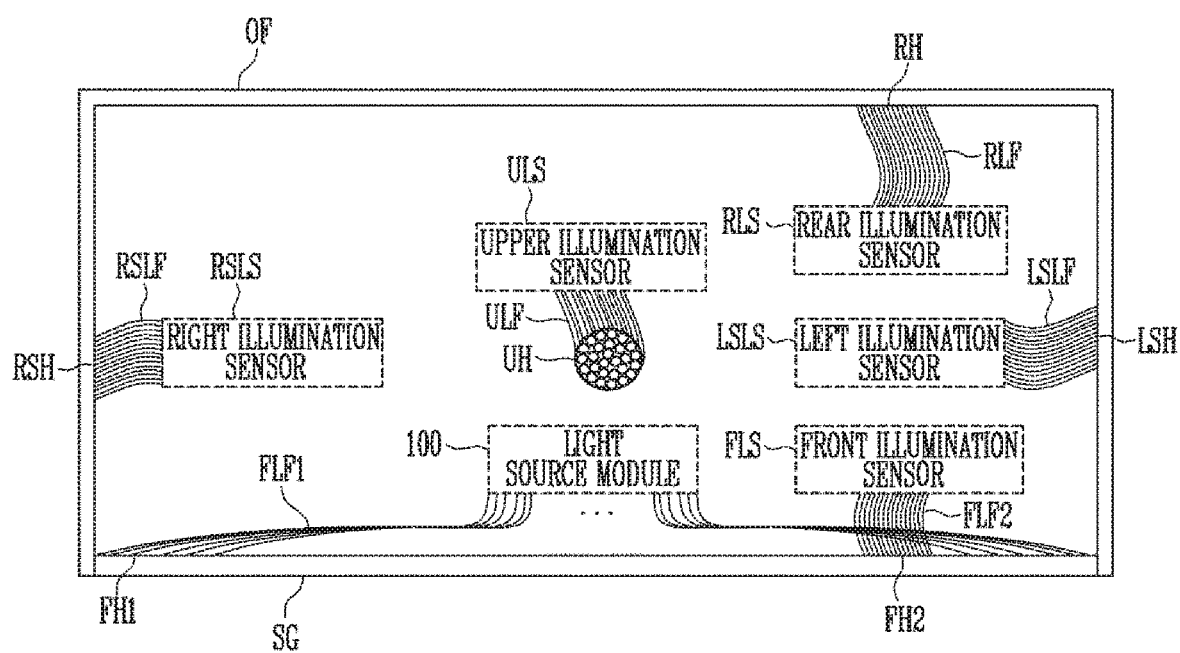
FIG. 3 is a view illustrating a case where a light source module and a front illumination sensor independently exist in the light emitting sign apparatus using the optical fiber in accordance with an embodiment of the present disclosure.

FIG. 3 is a view illustrating a case where the light source module and a front illumination sensor independently exist in the light emitting sign apparatus using the optical fiber in accordance with an embodiment of the present disclosure.

Referring to FIG. 3, the light emitting sign apparatus 10 using the optical fiber may further include a front illumination sensor FLS, second front optical fibers FLF2, outer illumination sensors RLS, ULS, LSLS, and RSLS, and outer optical fibers RLF, ULF, LSLF, and RS LF.

The front illumination sensor FLS and the outer illumination sensors RLS, ULS, LSLS, and RSLS may be connected to the light emitting sign apparatus 10 using the optical fiber through an extension port. In addition, although a case where the illumination sensors FLS, RLS, ULS, LSLS, and RSLS are spatially distinguished from each other is illustrated in FIG. 3, the illumination sensors FLS, RLS, ULS, LSLS, and RSLS may be collectively located in one substrate module depending on products.

The outer illumination sensors may include a rear illumination sensor RLS, an upper illumination sensor ULS, a left illumination sensor LSLS, and a right illumination sensor RSLS.

The outer optical fibers may include rear optical fibers RLF, upper optical fibers ULF, left optical fibers LSLF, and right optical fibers RSLF.

One ends of the rear optical fibers RLF may be connected to the rear emission holes RH, and the other ends of the rear optical fibers RLF may be optically coupled to the rear illumination sensor RLS. One ends of the upper optical fibers ULF may be connected to the upper emission holes UH, and the other ends of the upper optical fibers ULF may be optically coupled to the upper illumination sensor ULS. One ends of the left optical fibers LSLF may be connected to the left emission holes LSH, and the other ends of the left optical fibers LSLF may be optically coupled to the left illumination sensor LSLS. One ends of the right optical fibers RSLF may be connected to the right emission holes RSH, and the other ends of the right optical fibers RSLF may be optically coupled to the right illumination sensor RSLS. The term "the other end of an optical fiber is optically coupled to an illumination sensor" means that the illumination sensor and the optical fiber are disposed such that light emitted from the other end of the optical fiber can be incident onto the illumination sensor. Hereinafter, this description will be omitted.

In this embodiment, when the illumination sensors FLS, RLS, ULS, LSLS, and RSLS are accommodated in the outer frame 10 through the optical fibers, the illumination sensors FLS, RLS, ULS, LSLS, and RSLS are strong against external impact etc. even though relatively inexpensive illumination sensors are used as the illumination sensors FLS, RLS, ULS, LSLS, and RSLS. When the front illumination sensor FLS is directly attached to the front panel SG through a transmission window, the region of road information to be displayed is restricted. However, in this embodiment, when optical fibers are used, the region of road information can be sufficiently ensured by adjusting an area of the optical fibers (e.g., by adjusting a number of optical fiber strands, dispersed distribution for each region, etc.) even though the size of the front illumination sensor FLS is large.

In the embodiment shown in FIG. 3, the front illumination sensor FLS may be located independently from the light source module 100 in the accommodation space. One ends of the second front optical fibers FLF2 may be connected to the second front emission holes FH2, and the other ends of the second front optical fibers FLF2 may be optically coupled to the front illumination sensor FLS. In this embodiment, the front illumination sensor FLS uses the second front optical fibers FLF2 in a sensing period, and uses the first front optical fibers FLF1 in an emission period. Therefore, the sensing period and the emission period may temporally overlap with each other.

Figure 4:
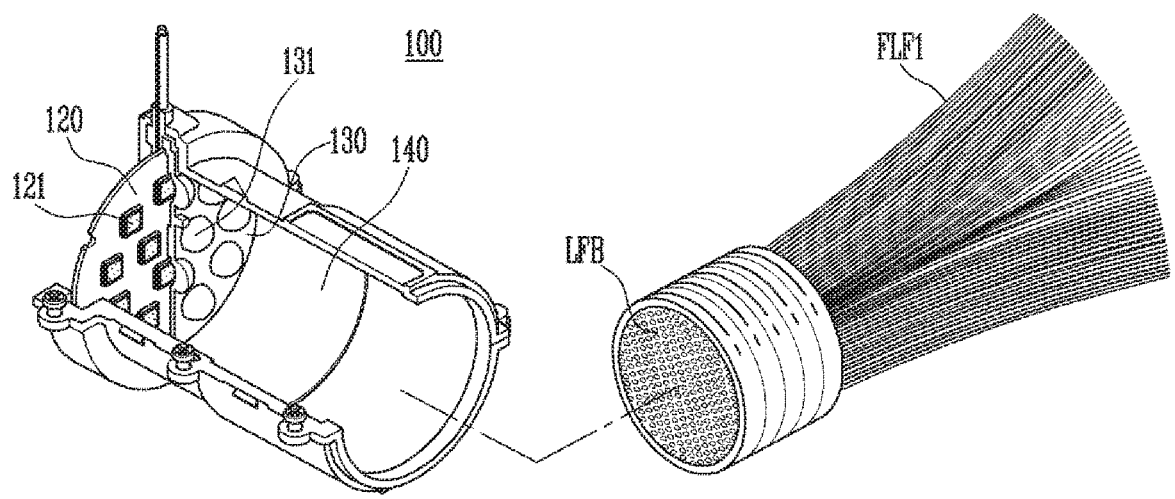
FIG. 4 is a view exemplarily illustrating a structure of the light source module shown in FIG. 3.

FIG. 4 is a view exemplarily illustrating a structure of the light source module shown in FIG. 3.

Referring to FIG. 4, the light source module 100 may selectively include a frame 140, light sources 121, a circuit board 120, and a lens layer 130.

The frame 140 may have a barrel shape. The other ends of the first front optical fibers FLF1 may constitute a binding part LFB as a concentrated bundle to be fitted into the frame 140. The frame may be made of various materials such as metal and plastic, and diffuse or reflect internal light.

The light sources 121 may be implemented with a device such as a light emitting diode (LED). The light sources 121 may be configured to emit light of the same color.

The light sources 121 may be disposed on the circuit board 120. The circuit board 120 may have a planar shape, and face the binding part LFB.

The lens layer 130 may cover the light source 121 and the circuit board 120. The lens layer 130 may be made of various transparent materials such as glass and plastic. The lens layer 130 may include lenses 131. Each of the lenses 131 may be configured as a convex lens, to concentrate the range of light emitted from the light sources 121 on the center.

Figure 5:
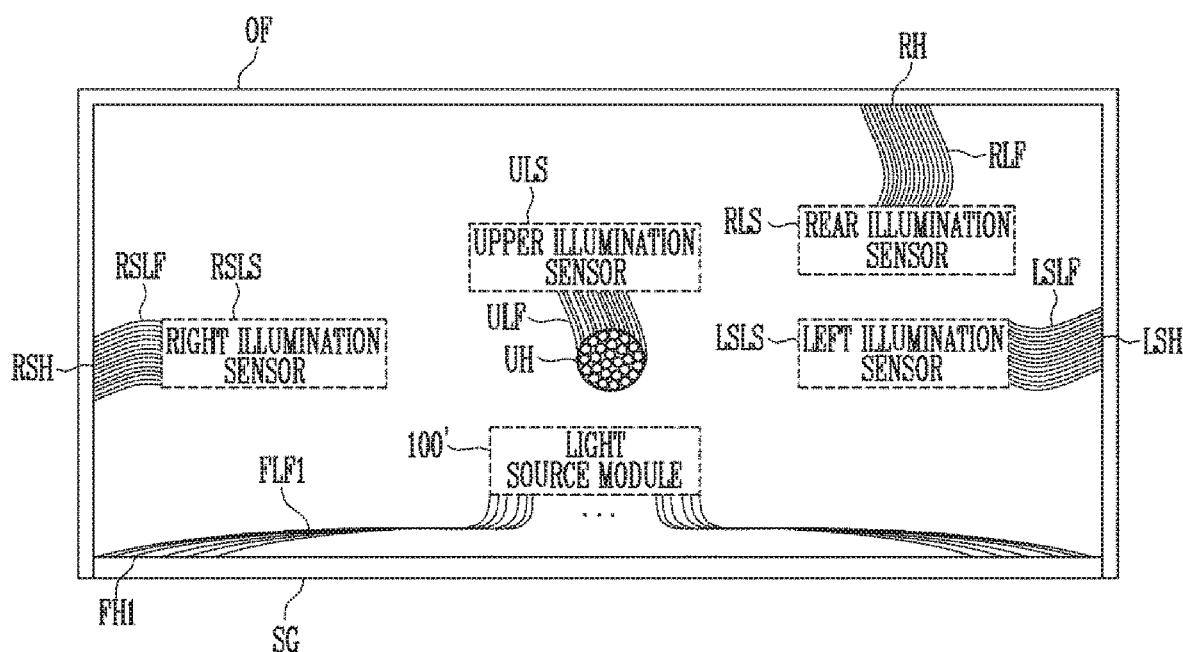
FIG. 5 is a view illustrating a case where a front illumination sensor is included in a light source module in a light emitting sign apparatus using an optical fiber in accordance with an embodiment of the present disclosure.

FIG. 5 is a view illustrating a case where a front illumination sensor is included in a light source module in a light emitting sign apparatus using an optical fiber in accordance with an embodiment of the present disclosure.

Referring to FIG. 5, the light emitting sign apparatus 10' using the optical fiber in accordance with the embodiment of the present disclosure may include outer illumination sensors RLS, ULS, LSLS, and RSLS and outer optical fibers RLF, ULF, LSLF, and RSLF. Descriptions of the outer illumination sensors RLS, ULS, LSLS, and RSLS and the outer optical fibers RLF, ULF, LSLF, and RSLF refer to FIG. 3.

Unlike the embodiment shown in FIG. 3, in the embodiment shown in FIG. 5, the second front optical fibers FLF2 and the second front emission holes FH2 do not exist. Accordingly, the internal configuration of a light source module 100' has been modified. This will be described with further reference to FIG. 6.

Figure 6:
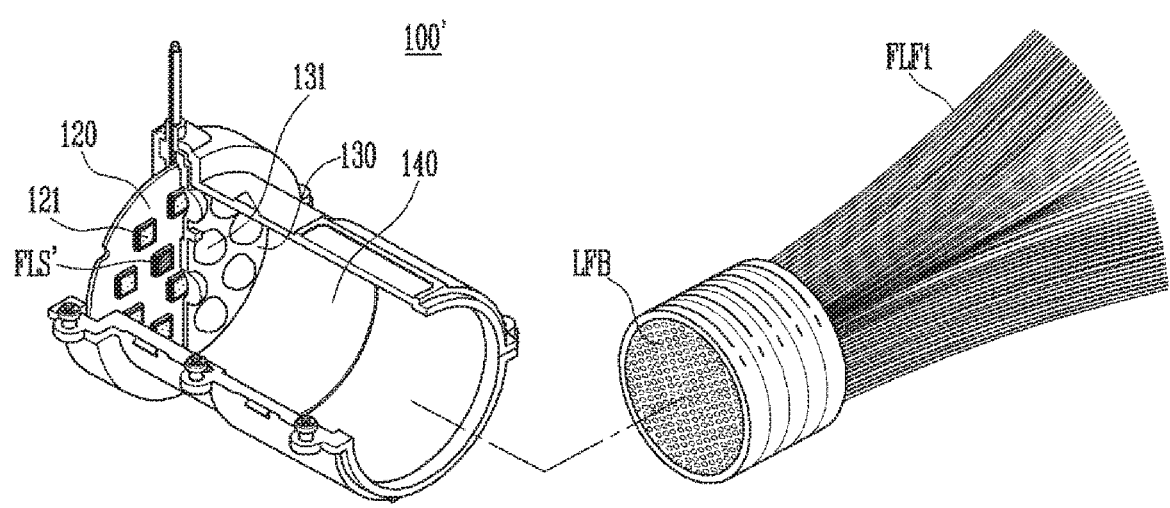
FIG. 6 is a view exemplarily illustrating a structure of the light source module shown in FIG. 5.

FIG. 6 is a view exemplarily illustrating a structure of the light source module shown in FIG. 5.

Referring to FIG. 6, the light module 100' may selectively include a front illumination sensor FLS', a frame 140, light sources 121, a circuit board 120, and a lens layer 130. Descriptions of the frame 140, the light sources 121, the circuit board 120, and the lens layer 130 refer to FIG. 4.

Unlike the embodiment shown in FIG. 4, in the embodiment shown in FIG. 6, at least one of the light sources 121 has been replaced with the front illumination sensor FLS'. Although a case where each of the light sources 121 has the same size as the front illumination sensor FLS' is illustrated in FIG. 6, the size of each of the light sources 121 and the size of the front illumination sensor FLS' may be different from each other.

The front illumination sensor FLS' may be optically coupled to the other ends of the first front optical fibers FLF1. For example, the front illumination sensor FLS' and the light sources 121 may be disposed to face the binding part LFB of the first front optical fibers FLF1.

In accordance with an embodiment, the lens layer 130 may concentrate light when the front illumination sensor FLS' is also covered with a lens 131 to receive light. In another embodiment, the lens layer 130 covers the light sources 121, but may be configured not to cover the front illumination sensor FLS'. For example, the lens layer 130 may have an opening with respect to a region corresponding to the front illumination sensor FLS'.

Unlike the embodiment shown in FIGS. 3 and 4, in the embodiment shown in FIGS. 5 and 6, the front illumination sensor FLS' and the light sources 121 share the first front optical fibers FLF1. Therefore, when a sensing period of the front illumination sensor FLS' and an emission period of the light sources 121 temporally overlap with each other, the front illumination sensor FLS senses erroneous illumination intensity information on light obtained by combining external light and internal light emitted by the light sources 121. Therefore, in accordance with an embodiment of the present disclosure, the controller 200 may control the sensing period of the front illumination sensor FLS' and the emission period of the light sources 121 not to temporally overlap with each other (i.e., to be temporally independent from each other) (time division driving).

In addition, the time division driving may be used at night. The front illumination sensor FLS' may be controlled to sense brightness of a headlamp of a vehicle that approaches the light emitting sign apparatus 10' using the optical fiber at night. When the emission period of the light sources 121 and the sensing period of the front illumination sensor FLS' overlap with each other, the front illumination sensor FLS' may erroneously sense the brightness of the headlamp of the vehicle, and therefore, the time division driving is suitable.

In particular, the time division driving may be useful on a local road on which vehicles are hardly driven at night. When illumination intensity measured by each of the front illumination sensor FLS' and the outer illumination sensors RLS, ULS, LSLS, and RSLS is close to 0, the light emitting sign apparatus 10' using the optical fiber may be configured such that the controller 200 enters into a night mode.

In the night mode, the controller 200 may control the road information of the front panel SG to be driven with the minimum brightness or put out by allowing the sensing period of the front illumination sensor FLS' to be relatively long and allowing the emission period of the light sources 121 to be relatively short.

Meanwhile, when an amount of light sensed from the front illumination sensor FLS' is increased, the controller 200 may determine that a vehicle has approached. Accordingly, the controller 200 may control the road information of the front panel SG to be driven with normal brightness by allowing the sensing period of the front illumination sensor FLS' to be relatively short and allowing the emission period of the light sources 121 to be relatively long.

In accordance with an embodiment, the controller 200 may estimate a position or time of the sun according to illumination intensity measured by each of the front illumination sensor FLS or FLS', the rear illumination sensor RLS, the upper illumination sensor ULS, the left illumination sensor LSLS, and the right illumination sensor RSLS, and determine a light emitting luminance of the light sources 121 according to the estimated position or time of the sun. Accordingly, power consumption of the light emitting sign apparatus 10 or 10' using the optical fiber can be reduced.

In order to drive the light emitting sign apparatus 10 or 10' using the optical fiber at daytime, sufficient visibility is ensured only when lighting brightness at daytime is to be five to ten times or more of the existing lighting brightness at night. The optimum brightness is changed depending on a sunny data, a cloudy data, or a foggy day. The optimum brightness is changed depending on a position condition of a road sign board and the sun in the sunny day.

In order to express the optimum visibility and attractiveness according to a condition in which a streetlamp adjacent to the light emitting sign apparatus 10 or 10' using the optical fiber is located at a front side, a rear side or a side of the light emitting sign apparatus 10 or 10' using the optical fiber at night in addition to daytime, it is necessary to appropriately adjust brightness. In addition, it is necessary to change a light emitting level depending on a condition in which light is scattered due to fog in a foggy environment.

For example, on a cloudy day, lighting brightness is suitable to be about three times of the lighting brightness at night. In a condition or time zone in which sunlight illuminates the rear side of the light emitting sign apparatus 10 or 10' using the optical fiber and shadow is formed at the front side of the light emitting sign apparatus 10 or 10' using the optical fiber, lighting brightness is suitable to be about five times of the lighting brightness at night. In a condition or time zone in which sunlight illuminates the front side of the light emitting sign apparatus 10 or 10' using the optical fiber, visibility is ensured only when the light emitting sign apparatus 10 or 10' using the optical fiber emits light with lighting brightness that is ten times of the lighting brightness at night.

In order to emit light with lighting brightness that is ten times of the lighting brightness at night, power to a level that exceeds the capacity of a battery is consumed, and hence the light emitting sign apparatus 10 or 10' using the optical fiber may be driven using a flickering method, so that power consumption of the light emitting sign apparatus 10 or 10' using the optical fiber can be reduced while ensuring visibility. When the light emitting sign apparatus 10 or 10' using the optical fiber is driven at daytime, the power consumption is increased when brightness is increased. Therefore, it is necessary to increase the capacity of the solar cell and the capacity of the battery.

In an embodiment of the present disclosure, brightness can be changed depending on a location condition of the light emitting sign apparatus 10 or 10' using the optical fiber and the sun so as to reduce the power consumption, and a lighting mode optimized for the environment of a road on which a sign is installed may be autonomously diversified by analyzing a position state and a brightness level of the sun through an implemented illumination sensor sensing system.

In accordance with this embodiment, amounts of light irradiated onto the front side, rear side, upper side, and two sides of the light emitting sign apparatus 10 or 10' using the optical fiber can be measured, and positions (directions), etc. of the sun at daytime/night and on a cloudy day and a sunny day can be analyzed/distinguished by analyzing the amounts of light irradiated onto the respective sides.

Change in illumination intensity with respect to installation direction of the light emitting sign apparatus 10 or 10' using the optical fiber and time will be exemplarily described with reference to FIGS. 7 to 10.

Figure 7:
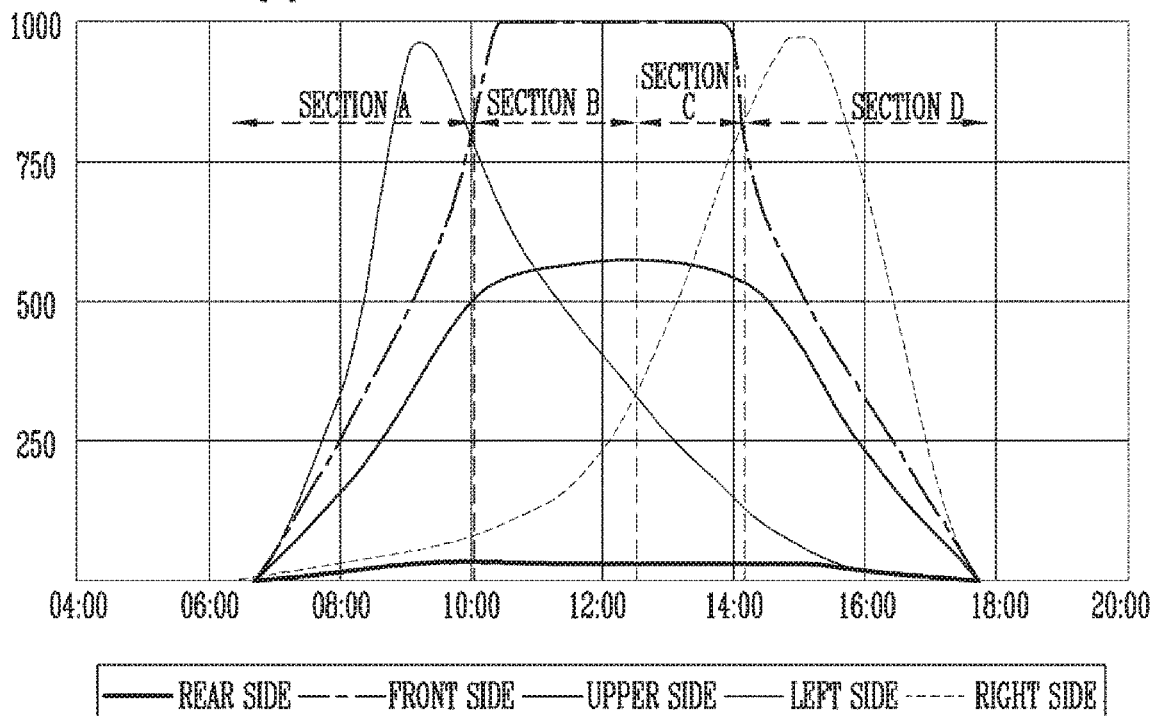
FIG. 7 is a view illustrating change in illumination intensity with respect to time when a front panel of the light emitting sign apparatus using the optical fiber is installed toward south in accordance with an embodiment of the present disclosure.

FIG. 7 is a view illustrating change in illumination intensity with respect to time when the front panel of the light emitting sign apparatus using the optical fiber is installed toward south in accordance with an embodiment of the present disclosure.

In section A shown in FIG. 7, the sun is located at the left of the light emitting sign apparatus 10 or 10' using the optical fiber since the illumination intensity of a left side is measured highest. The sun is located in a front direction at the left of the light emitting sign apparatus 10 or 10' using the optical fiber since the illumination intensity of a front side is higher than that of a rear side.

In sections B and C shown in FIG. 7, the sun is located at the front of the light emitting sign apparatus 10 or 10' using the optical fiber since the illumination intensity of the front side is measured highest. The sun is located in a left direction at the front of the light emitting sign apparatus 10 or 10' using the optical fiber since the illumination intensity of the left side is higher than that of a right side in the section B. The sun is located in a right direction at the front of the light emitting sign apparatus 10 or 10' using the optical fiber since the illumination intensity of the right side is higher than that of the left side.

In section D shown in FIG. 7, the sun is located at the right of the light emitting sign apparatus 10 or 10' using the optical fiber since the illumination intensity of the right side is measured highest. The sun is located in the front direction at the right of the light emitting sign apparatus 10 or 10' using the optical fiber since the illumination intensity of the front side is higher than that of the rear side.

In addition, since the illumination intensity of the front side is measured higher than that of an upper side throughout all sections of daytime, the sun moves along a path in which the altitude of the sun is 40 degrees or less. Therefore, this may be estimated as data are measured in winter (winter solstice). On the contrary, the case where the illumination intensity of the upper side is measured higher than that of the front side becomes a case where the altitude of the sun is 45 degrees or more. Therefore, this may be estimated as data measured before/after midday in summer (summer solstice).

In an example, in the light emitting sign apparatus 10 or 10' using the optical fiber installed toward south, sunlight illuminates the front side of the light emitting sign apparatus 10 or 10' using the optical fiber since the illumination intensity of the rear side is measured higher than that of the front side throughout all sections of daytime on a sunny day. Thus, in the light emitting sign apparatus 10 or 10' using the optical fiber installed toward south, lighting (or flickering) is made with a brightness that is about ten times of that at night in all the sections of the daytime, so that attractiveness and visibility can be provided.

Although not shown in FIG. 7, a cloudy environment may occur in some sections of the daytime, a graph may be formed to a level where, in the cloudy environment, the illumination intensity of each of all the sides is lowered to 500 lx, and the illumination intensity of the upper side is highest. This is a condition in which sunlight does not illuminate the light emitting sign apparatus 10 or 10' using the optical fiber, and thus the attractiveness and visibility can be provided even when lighting is made with a brightness that is about three to five times of that at the night.

Figure 8:
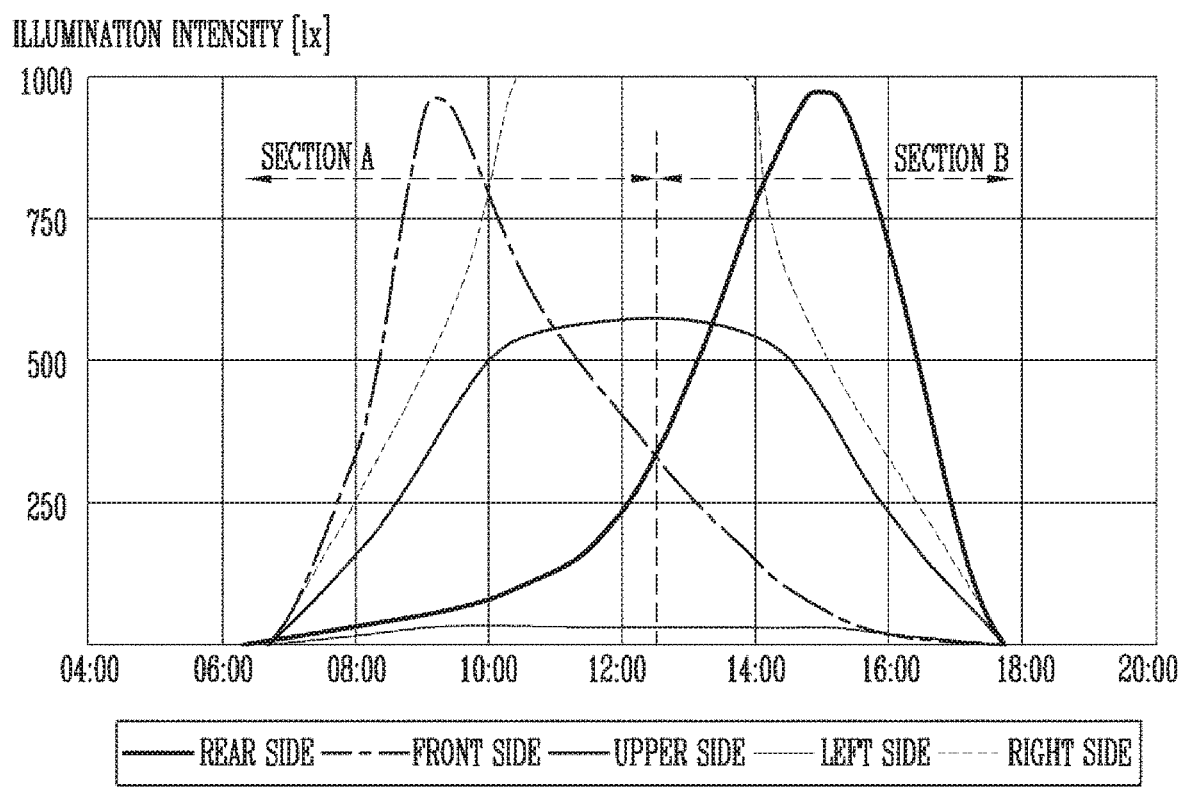
FIG. 8 is a view illustrating change in illumination intensity with respect to time when the front panel of the light emitting sign apparatus using the optical fiber is installed toward east in accordance with an embodiment of the present disclosure.

FIG. 8 is a view illustrating change in illumination intensity with respect to time when the front panel of the light emitting sign apparatus using the optical fiber is installed toward east in accordance with an embodiment of the present disclosure.

In the light emitting sign apparatus 10 or 10' using the optical fiber installed toward east, since the illumination intensity of the front side is measured higher than that of the rear side in a morning time zone (section A) on a sunny day, sunlight illuminates the front side of the light emitting sign apparatus 10 or 10' using the optical fiber, and thus lighting (or flickering) is made with a brightness that is about ten times of that at night in the morning time zone. Since the illumination intensity of the rear side is measured higher than that of the front side in an afternoon time zone (section B), shadow is formed on the front side of the light emitting sign apparatus 10 or 10' using the optical fiber, and thus the attractiveness and visibility can be provided even when lighting is made with a brightness that is about five times of that at the night.

Figure 9:
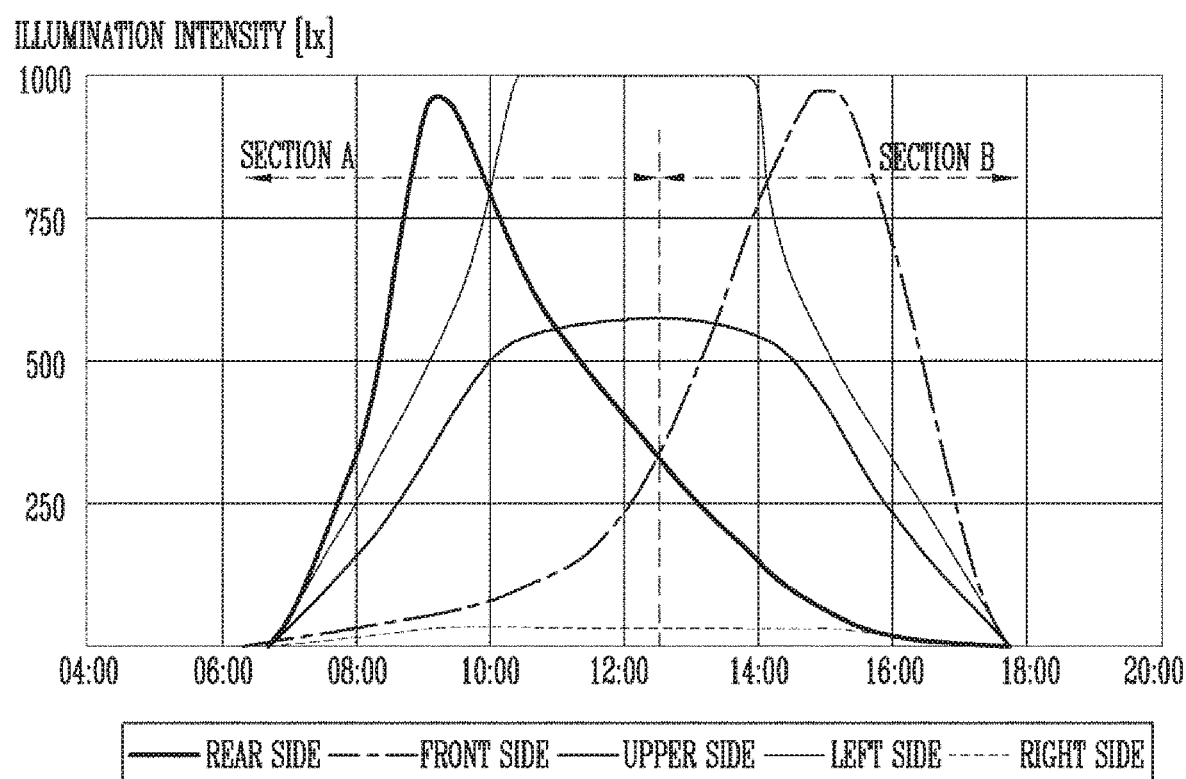
FIG. 9 is a view illustrating change in illumination intensity with respect to time when the front panel of the light emitting sign apparatus using the optical fiber is installed toward west in accordance with an embodiment of the present disclosure.

FIG. 9 is a view illustrating change in illumination intensity with respect to time when the front panel of the light emitting sign apparatus using the optical fiber is installed toward west in accordance with an embodiment of the present disclosure.

In the light emitting sign apparatus 10 or 10' using the optical fiber installed toward west, since the illumination intensity of the front side is measured lower than that of the rear side in a morning time zone (section A) on a sunny day, shadow is formed on the front side of the light emitting sign apparatus 10 or 10' using the optical fiber, and thus lighting (or flickering) is made with a brightness that is about five times of that at night in the morning time zone. Since the illumination intensity of the front side is measured higher than that of the rear side in an afternoon time zone (section B), sunlight illuminates the front side of the light emitting sign apparatus 10 or 10' using the optical fiber. Thus, lighting (or flickering) is made with a brightness that is about ten times of that at the night, so that the attractiveness and visibility can be provided.

Figure 10:
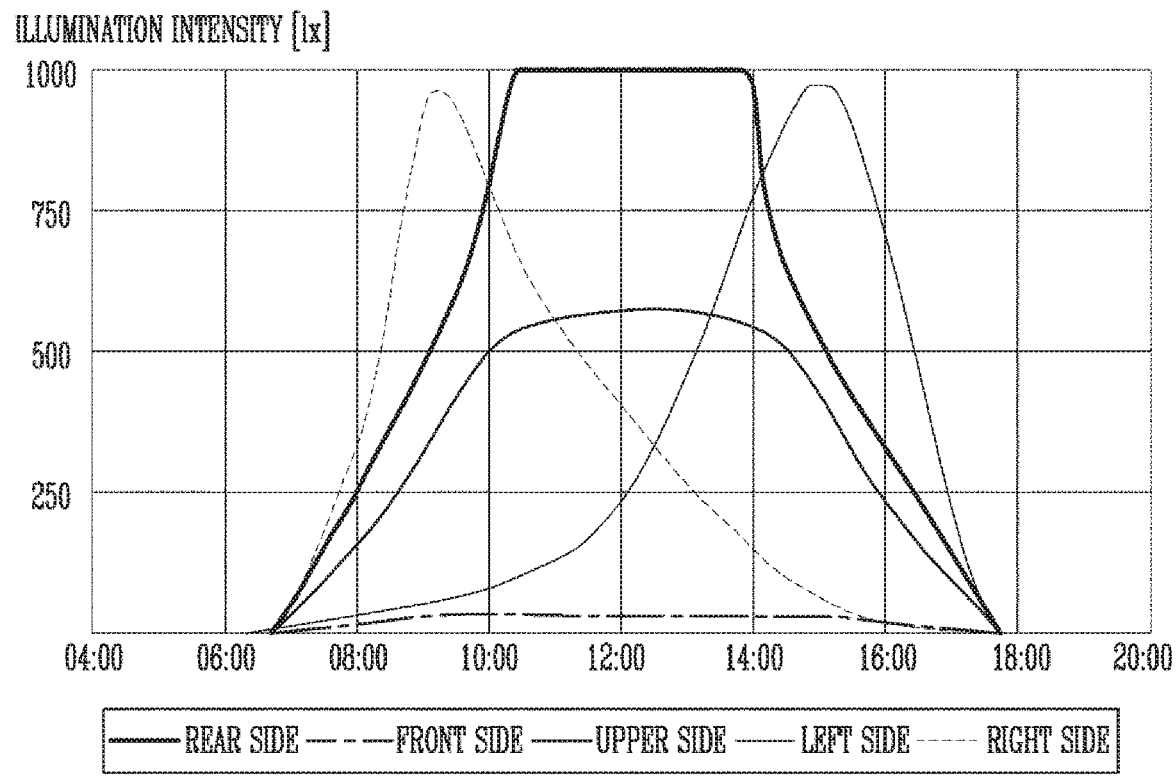
FIG. 10 is a view illustrating change in illumination intensity with respect to time when the front panel of the light emitting sign apparatus using the optical fiber is installed toward north in accordance with an embodiment of the present disclosure.

FIG. 10 is a view illustrating change in illumination intensity with respect to time when the front panel of the light emitting sign apparatus using the optical fiber is installed toward north in accordance with an embodiment of the present disclosure.

In the light emitting sign apparatus 10 or 10' using the optical fiber installed toward north, since the illumination intensity of the front side is measured lower than that of the rear side in all sections of daytime on a sunny day, shadow is formed on the front side of the light emitting sign apparatus 10 or 10' using the optical fiber, and lighting is made with a brightness that is about five times of that at night in all the sections of the daytime, so that the attractiveness and visibility can be provided.

Figure 11:
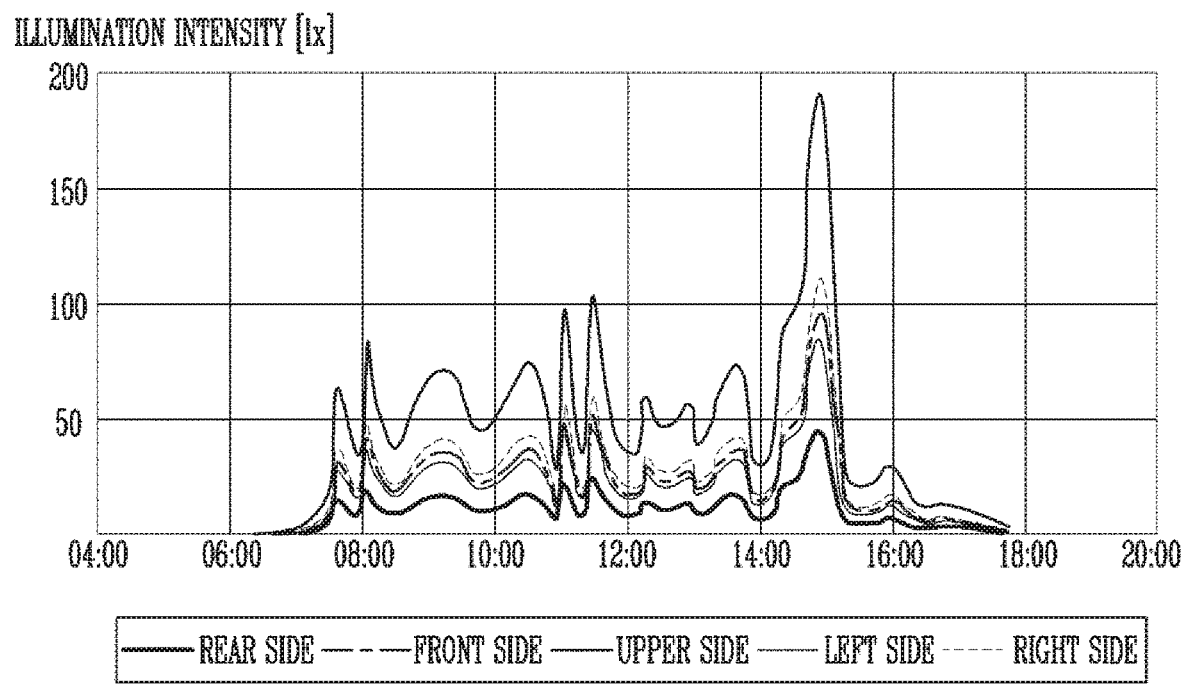
FIG. 11 is a view illustrating change in illumination intensity with respect to time, measured on a cloudy day by illumination sensors of the light emitting sign apparatus using the optical fiber in accordance with an embodiment of the present disclosure.

FIG. 11 is a view illustrating change in illumination intensity with respect to time, measured on a cloudy day by illumination sensors of the light emitting sign apparatus using the optical fiber in accordance with an embodiment of the present disclosure.

On the cloudy day, illumination intensity of 200 lx or less is measured throughout daytime, and sufficient attractiveness and visibility can be provided even when lighting is made with a brightness that is about three times of that at night.

On the cloudy day on which the illumination intensity of each of all the sides is measured to about 300 lx or less, a cloudy level is determined according to the measured illumination intensity. Therefore, a dimming level may be adjusted in proportion to the cloudy level (simple cloudy, black cloudy, rainy weather, etc.).

Figure 12:
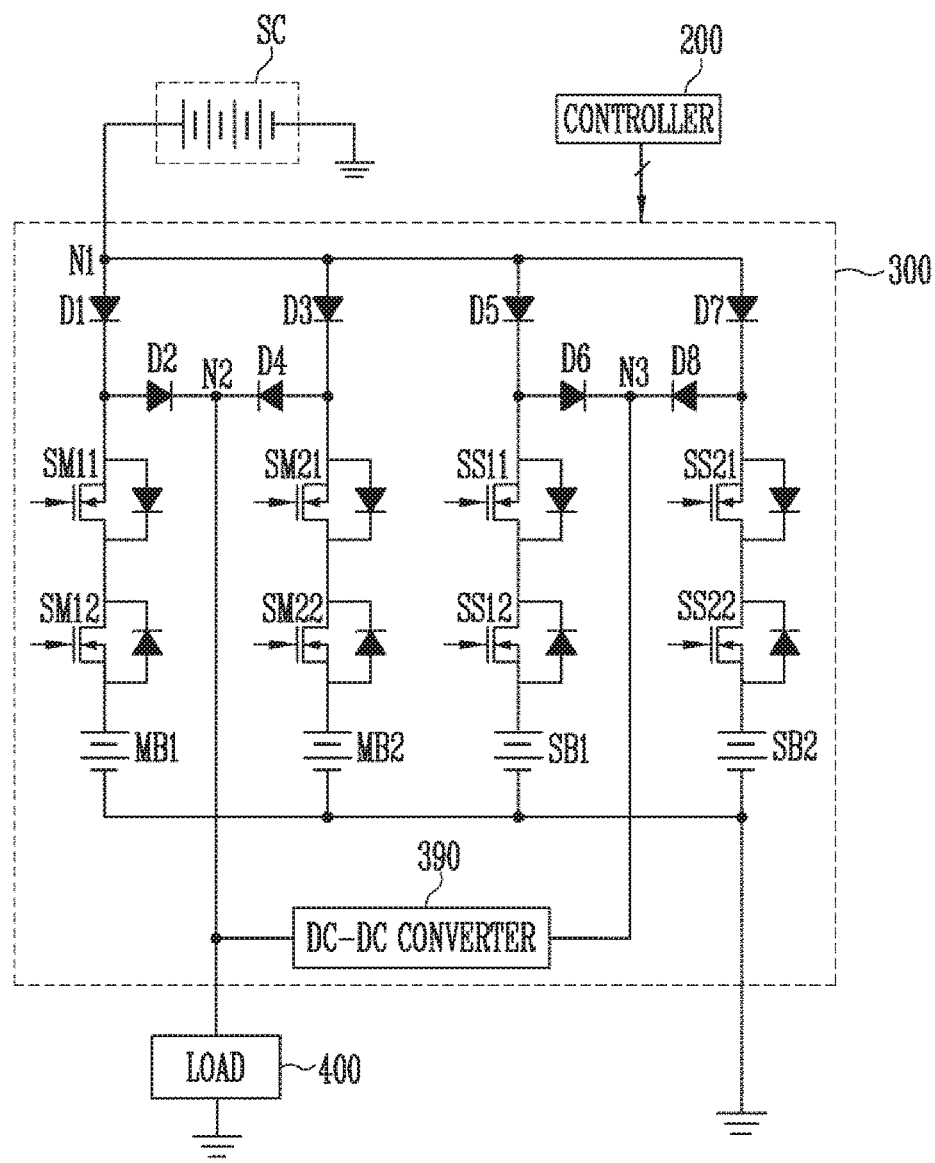
FIG. 12 is a view illustrating a battery module of the light emitting sign apparatus using the optical fiber in accordance with an embodiment of the present disclosure.

FIG. 12 is a view illustrating a battery module of the light emitting sign apparatus using the optical fiber in accordance with an embodiment of the present disclosure.

Referring to FIG. 12, the light emitting sign apparatus 10 or 10' using the optical fiber may include a solar cell SC, a controller 200, a battery module 300, and a load 400.

The load 400 may generally include not only the light sources 121 but also devices that consume power, such as the controller 200. The load 400 may be connected to a second node N2.

A positive electrode of the solar cell SC may be connected to a first node N1. The solar cell SC may generate power at daytime and supply the generated power to the first node N1.

The battery module 300 may include a first main battery MB1, a second main battery MB2, a first sub-battery SB1, a second sub-battery SB2, charge/discharge switches SM11, SM12, SM21, SM22, SS11, SS12, SS21, and SS22, diodes D1, D2, D3, D4, D5, D6, D7, and D8, and a DC-DC converter 390.

An anode of a first diode D1 may be connected to the first node N1, and a cathode of the first diode D1 may be connected to a side of charge/discharge switches SM11 and SM12 of the first main battery MB1. An anode of a second diode D2 may be connected to the side of the charge/discharge switches SM11 and SM12 of the first main battery MB1, and a cathode of the second diode D2 may be connected to the second node N2. An anode of a third diode D3 may be connected to the first node N1, and a cathode of the third diode D3 may be connected to a side of charge/discharge switches SM21 and SM22 of the second main battery MB2. An anode of a fourth diode D4 may be connected to the side of the charge/discharge switches SM21 and SM22 of the second main battery MB2, and a cathode of the fourth diode D4 may be connected to the second node N2.

An anode of a fifth diode D5 may be connected to the first node N1, and a cathode of the fifth diode D5 may be connected to a side of charge/discharge switches SS11 and SS12 of the first sub-battery SB1. An anode of a sixth diode D6 may be connected to the side of the charge/discharge switches SS11 and SS12 of the first sub-battery SB1, and a cathode of the sixth diode D6 may be connected to a third node N3. An anode of a seventh diode D7 may be connected to the first node N1, and a cathode of the seventh diode D7 may be connected to a side of charge/discharge switches SS21 and SS22 of the second sub-battery SB2. An anode of an eighth diode D8 may be connected to the side of the charge/discharge switches SS21 and SS22 of the second sub-battery SB2, and a cathode of the eighth diode D8 may be connected to the third node N3.

The first main battery MB1 may receive charge power from the first node N1 through the charge/discharge switches SM11 and SM12 or supply discharge power to the second node N2 through the charge/discharge switches SM11 and SM12. For example, when a charge switch SM12 is turned on by the controller 200 and a discharge switch SM11 is turned off by the controller 200, the first main battery MB1 may receive the charge power from the first node N1. In addition, when the discharge switch SM11 is turned on by the controller 200 and the charge switch SM12 is turned off by the controller 200, the first main battery MB1 may supply the discharge power to the second node N2. In addition, when both the discharge switch SM11 and the charge switch SM12 are turned off by the controller 200, the first main battery MB1 may enter into a standby mode.

The second main battery MB2 may receive charge power from the first node N1 through the charge/discharge switches SM21 and SM22 or supply discharge power to the second node N2 through the charge/discharge switches SM21 and SM22. For example, when a charge switch SM22 is turned on by the controller 200 and a discharge switch SM21 is turned off by the controller 200, the second main battery MB2 may receive the charge power from the first node N1. In addition, when the discharge switch SM21 is turned on by the controller 200 and the charge switch SM22 is turned off by the controller 200, the second main battery MB2 may supply the discharge power to the second node N2. In addition, when both the discharge switch SM21 and the charge switch SM22 are turned off, the second main battery MB2 may enter into the standby mode.

The first sub-battery SB1 may receive charge power from the first node N1 through the charge/discharge switches SS11 and SS12 or supply discharge power to the third node N3 through the charge/discharge switches SS11 and SS12. For example, when a charge switch SS12 is turned on by the controller 200 and a discharge switch SS11 is turned off by the controller 200, the first sub-battery SB1 may receive the charge power from the first node N1. In addition, when the discharge switch SS11 is turned on by the controller 200 and the charge switch SS12 is turned off by the controller 200, the first sub-battery SB1 may supply the discharge power to the third node N3. In addition, when both the discharge switch SS11 and the charge switch SS12 are turned off by the controller 200, the first sub-battery SB1 may enter into the standby mode.

The second sub-battery SB2 may receive charge power from the first node N1 through the charge/discharge switches SS21 and SS22 or supply discharge power to the third node N3 through the charge/discharge switches SS21 and SS22. For example, when a charge switch S22 is turned on by the controller 200 and a discharge switch SS21 is turned off by the controller 200, the second sub-battery SB2 may receive the charge power from the first node N1. In addition, when the discharge switch SS21 is turned on by the controller 200 and the charge switch SS22 is turned off by the controller 200, the second sub-battery SB2 may supply the discharge power to the third node N3. In addition, when both the discharge switch SS21 and the charge switch SS22 are turned off by the controller 200, the second sub-battery SB2 may enter into the standby mode.

The DC-DC converter 390 may be located between the second node N2 and the third node N3. The main batteries MB1 and MB2 and the sub-batteries SB1 and SB2 may be configured as batteries having different standards, or have different capacities. In order to adjust a voltage difference between the second node N2 and the third node N3, which is generated due to this, (or to boost a voltage of the second node N2 or the third node N3), the DC-DC converter 390 may be located between the second node N2 and the third node N3. For example, when power necessary for the load 400 is supplied, a voltage of the third node N3 may be lower than that of the second node N2.

A conventional light emitting sign apparatus using an optical fiber is configured with a system that drives the light emitting sign apparatus using the optical fiber by storing power in a battery module by using a solar cell at daytime and supplying power to a light source by using the stored power at night. Therefore, charge and discharge cannot be made at the same time, and surplus power generated by the solar cell cannot be used even after a battery is charged.

In the embodiment of the present disclosure, the charge switches SM12, SM22, SS12, and SS22 and the discharge switches SM11, SM21, SS11, and SS21 are separately configured at a power input/output terminal of each of the batteries MB1, MB2, SB1, and SB2, and the battery is switched to a charge/discharge battery through switching control. Thus, lighting can be made by supplying certain power to the light source even at daytime, and surplus power can be stored in the battery module 300.

The first main battery MB1 and the second main battery MB2 may be used as batteries having the same standard, and a dual power path circuit is configured in each of the main batteries MB1 and MB2. Thus, the first main battery MB1 in a charge cycle performs only charging, and the second main battery MB2 in a discharge cycle performs only discharging. Accordingly, charging/discharging can be performed at the same time while protecting an available cycle of the battery.

In addition, when the first main battery MB1 that is performing charging is fully charged, the mode of the first main battery MB1 is changed to the standby mode by stopping the charging, and surplus electricity being generated is directly applied to the load being discharged. Thus, the surplus electricity can be used as electricity consumed in the load 400 together with the second main battery MB2 being discharged.

Such a system can protect the available cycle of the battery, and allow lighting to be made at daytime. Accordingly, the visibility of the light emitting sign apparatus using the optical fiber, which is changed depending on a change in altitude of the sun, can be improved, and power produced by the solar cell SC can be maximally used.

Figure 13:
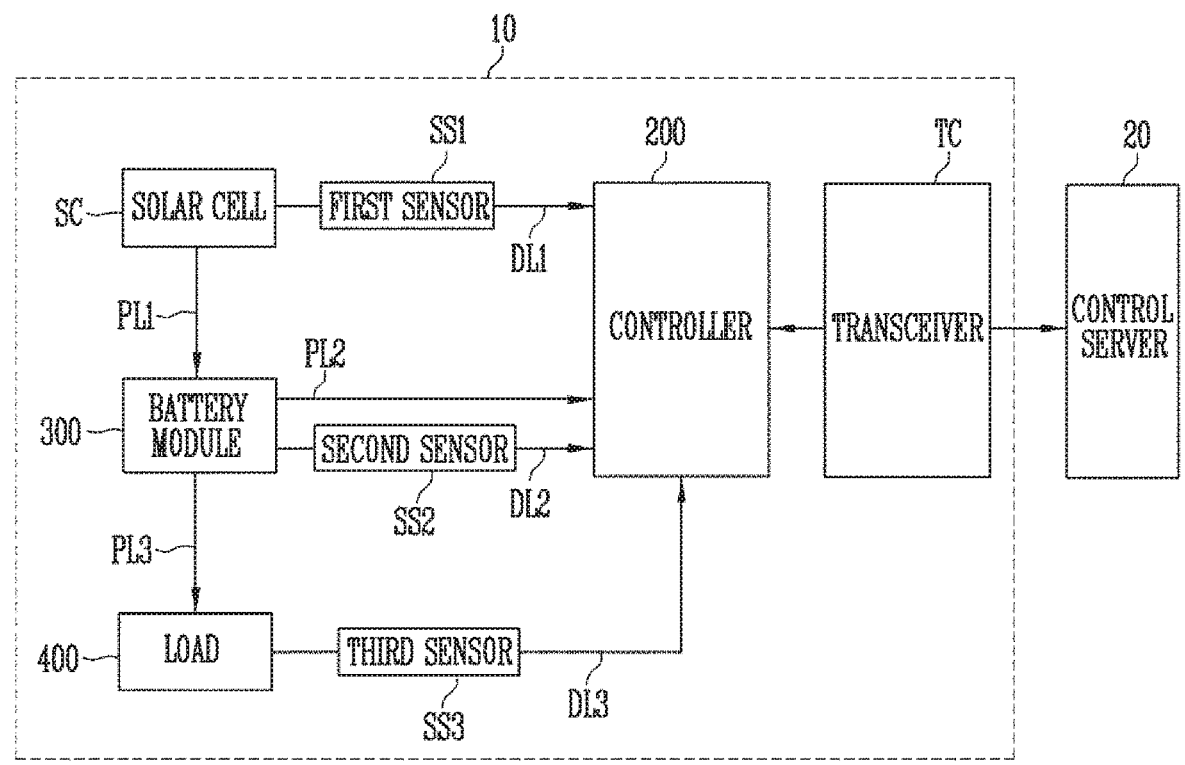
FIG. 13 is a view illustrating a self-diagnosis system of the light emitting sign apparatus using the optical fiber in accordance with an embodiment of the present disclosure.

FIG. 13 is a view illustrating a self-diagnosis system of the light emitting sign apparatus using the optical fiber in accordance with an embodiment of the present disclosure.

Referring to FIG. 13, the self-diagnosis system 9 may include the light emitting sign apparatus 10 using the optical fiber and a control server 20.

The light emitting sign apparatus 10 using the optical fiber may include a first sensor SS1, a second sensor SS2, a third sensor SS3, and a transceiver TC, in addition to the solar cell SC, the battery module, the load 400, and the controller 200, which are described above.

The solar cell SC may supply power to the battery module 300 through a first power line PL1. Referring back to FIG. 12, the first power line PL1 may correspond to the first node N1.

The battery module 300 may supply power to the controller 200 through a second power line PL2. Also, the battery module 300 may supply power to the load 400 through a third power line PL3. Referring back to FIG. 12, the third power line PL3 may correspond to the second node N2.

The controller 200 may sense currents or voltages in the solar cell SC, the battery module 300, and the load 400 by using at least one sensor. In the embodiment shown in FIG. 13, the at least one sensor includes the first to third sensors SS1, SS2, and SS3. For example, the first sensor SS1 may be located on a first sensing line DL1 connecting the solar cell SC to the controller 200. The second sensor SS2 may be located on a second sensing line DL2 connecting the battery module 300 to the controller 200. In addition, the third sensor SS3 may be located on a third sensing line DL3 connecting the load 400 to the controller 200. As described above, the sensors separated from each other are used, so that at which part among the solar cell SC, the battery module 300, and the load 400 a failure has occurred can be sensed.

In some embodiments, the controller 200 may autonomously determine and diversify a driving mode suitable for a power generation amount of a corresponding position by sensing and analyzing a tendency of power generation amount for each day in the existing sunshine shortage area such as shadow of a tree or a space between buildings in a downtown area, in which it is difficult to install the light emitting sign apparatus using the optical fiber. For example, the controller 200 is driven to decrease basic lighting brightness to 70% at a time for which charging shortage continuously occurs through the analysis of the tendency of power generation amount for each day. When the power generation amount is recovered, the controller 200 is driven to increase to 100%. If necessary, the controller 200 is driven to increase up to 130% at a surplus charging time. Thus, optimum information can be provided to a driver.

A current consumed for each LED light source module and a driving time for each LED light source module may be accumulated and counted to be recorded in an internal memory of the controller, and programming is possible to manage the expected lifespan of an LED light source. For example, when a case where the amount of current consumed in the LED light source is increased according to different weather environments and different installation conditions of areas frequently occurs, a case where a remaining lifespan of the LED light source is shorter than the target lifespan of the LED light source due to heat generation in proportion to the consumed current may occur. Accordingly, the controller 200 reduces power consumption by changing the mode of the controller 200 to a low power mode, so that lighting that exceeds the expected lifespan of the LED light source can be reduced. Thus, the remaining lifespan of the LED light source can be maintained up to the expected lifespan of the LED light source, and a lighting mode optimized for a given environment can be autonomously determined.

In some embodiments, the controller 200 may periodically transmit sensing information of the first to third sensors SS1, SS2, and SS3 to the control server 20 through the transceiver TC. The controller 200 and the transceiver TC may be integrally configured depending on a product. The transceiver TC and the control server 20 may communicate with each other through a predetermined protocol and a small quantity data communication network at low cost.

The control server 20 may actively take analysis and action according to the received information. For example, the control server 20 may include a data server, and analyze a pattern, based on information of the light emitting sign apparatus 10 using the optical fiber, which is received by the data server, so that a failure can be diagnosed. The control server 20 may transmit diagnosis result information or action information corresponding thereto to the transceiver TC, based on a result obtained by diagnosing the failure. The controller 200 may actively take action with respect to the failure according to the diagnosis result information or passively take action with respect to the failure according to the action information.

In some embodiments, the controller 200 may receive real-time weather information corresponding to position information of the light emitting sign apparatus 10 using the optical fiber from the control server 20 through the transceiver TC by using a predetermined protocol.

The received weather information for each area may become a reference that allows the controller 200 determines a lighting mode, and maximize the visibility of a driver by adjusting lighting brightness and lighting period through a calculator built in the controller 200. For example, this may be applied when road freezing such as black ice in winter is predicted. A message for inducing speed reduction is flickered at a ratio of 3:7 per second with a brightness that is ten times of general lighting brightness by sensing a speed of a vehicle, which exceeds the safety speed, so that a notice message can be provided to a driver. In addition, a strong warning message that is rapidly flickered twice per 0.5 second with a brightness that is twenty times than the general lighting brightness is provided to a driver of a vehicle of which speed is not reduced by sensing the speed of the vehicle through a speed sensor, so that active speed reduction can be induced in response to the speed of the vehicle. The speed sensor will be described later with reference to FIG. 14.

Figure 14:
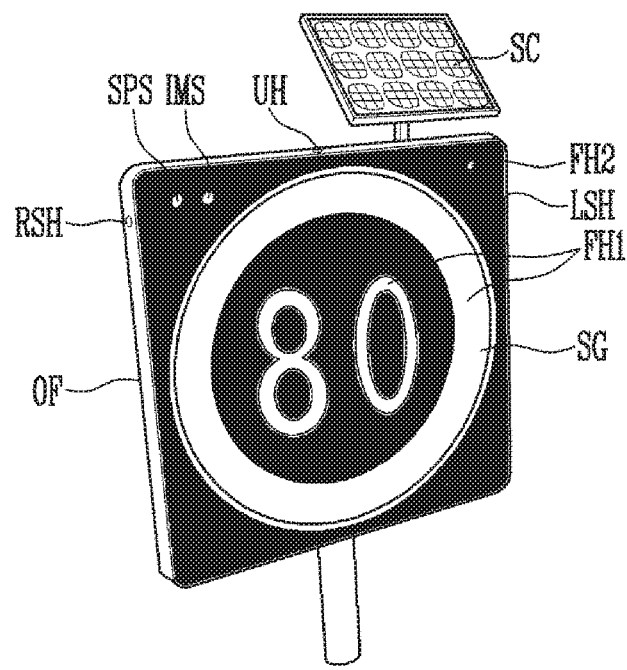
FIG. 14 is a view illustrating a case where a light emitting sign apparatus using an optical fiber includes a speed sensor and an image sensor in accordance with an embodiment of the present disclosure.

FIG. 14 is a view illustrating a case where a light emitting sign apparatus using an optical fiber includes a speed sensor and an image sensor in accordance with an embodiment of the present disclosure.

Referring to FIG. 14, the light emitting sign apparatus 10a using the optical fiber in accordance with the embodiment of the present disclosure may further include a speed sensor SPS and an image sensor IMS. The speed sensor SPS and the image sensor IMS may be connected to the light emitting sign apparatus 10a using the optical fiber through the above-described extension port.

The speed sensor SPS may be implemented with a Doppler sensor using a frequency division scheme, which can distinguish speeds of vehicles on a plurality of lanes. The speed sensor SPS may be combined with a dedicated image sensor IMS capable of recognizing license plates of vehicles to directly transmit a message for inducing speed reduction to a vehicle necessary for the speed reduction by using a V2I communication module built in the light emitting sign apparatus 10a using the optical fiber, so that real-time control can be achieved. This may be applied to an adaptive cruise control system capable of automatically controlling the speed of a vehicle through a wave communication protocol pre-arranged with a vehicle manufacturer.

Figure 15:
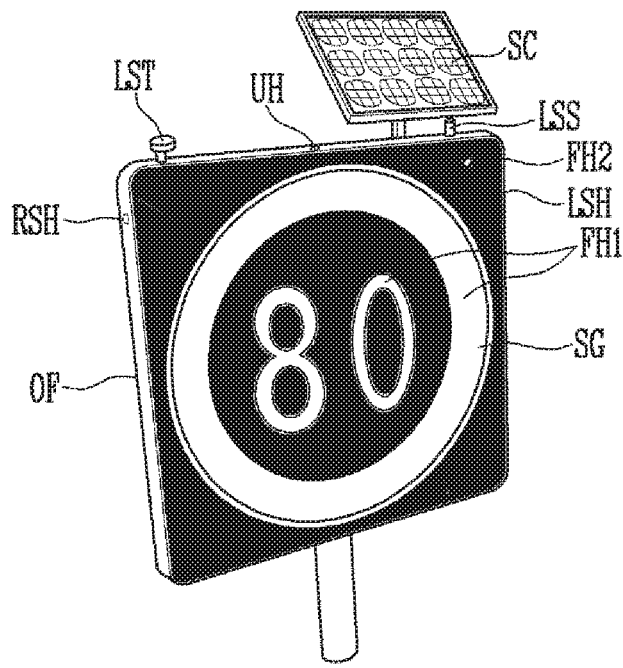
FIG. 15 is a view illustrating a case where a light emitting sign apparatus using an optical fiber includes fog sensors in accordance with an embodiment of the present disclosure.

FIG. 15 is a view illustrating a case where a light emitting sign apparatus using an optical fiber includes fog sensors in accordance with an embodiment of the present disclosure.

Referring to FIG. 15, the light emitting sign apparatus 10b using the optical fiber in accordance with the embodiment of the present disclosure may further include fog sensors LST, LSS, . . . . The fog sensors LST, LSS, . . . may be connected to the light emitting sign apparatus 10b using the optical fiber through the above-described extension port.

Although only some LST and LSS of the fog sensors LST, LSS, . . . , which are located at the periphery of the light emitting sign apparatus 10b using the optical fiber, are illustrated in FIG. 15, the others of the fog sensors LST, LSS, . . . may be provided in the light emitting sign apparatus 10b using the optical fiber.

For example, the fog sensors LST, LSS, . . . may include a temperature sensor, a humidity sensor, an atmospheric pressure sensor, a laser light source LST, and a light receiving sensor LSS.

The controller 200 may sense whether fog occurs, based on a saturated water vapor pressure curve, by using the temperature sensor, the humidity sensor, and the atmospheric pressure sensor. Data of the saturated water vapor pressure curve may be established as a separate lookup table to be stored in a memory of the controller 200. In another embodiment, the controller 200 may transmit sensing information to the control server 20 through the transceiver TC, and the control server 20 may provide the controller 200 with whether the fog occurs by analyzing the received sensing information. The control server 20 may combines weather information received from another server in addition to the received sensing information, so that whether the fog occurs can be more accurately determined.

The laser light source LST and the light receiving sensor LSS may be selective components provided to more accurately sense whether the fog occurs. For example, when light irradiated by the laser light source LST is partially scattered by condensed vapor, the amount of light sensed by the light receiving sensor LSS may be decreased. The controller 200 may determine that more dense fog occurs as the amount of light sensed by the light receiving sensor LSS is decreased. Also, the controller 200 may sense an amount of light by using the above-described illumination sensor.

When occurrence of fog is sensed, the controller 200 allows lighting to be made by using a light source of a color (e.g., red or yellow) that has relatively small light scattering, so that the visibility of a driver can be improved.

The light emitting sign apparatus using the optical fiber can have improved reliability with respect to vibration, impact, etc. even though relatively inexpensive illumination sensors are used.

Further, the light emitting sign apparatus using the optical fiber can reduce power consumption by determining a light emitting luminance of the light sources according to a position or time of the sun, which is estimated using the illumination sensors.

Further, the light emitting sign apparatus using the optical fiber can include a battery module that can extend the lifespan of a battery by maintaining charge/discharge cycles of the battery even in various situations such as a change in light emitting luminance of the light sources, and maximally use power produced by the solar cell.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A light emitting sign apparatus using an optical fiber, comprising:
    an outer frame including an accommodation space having an opened front side, wherein the outer frame has at least one other side different than the opened front side;
    a front panel covering the opened front side of the outer frame, the front panel including a plurality of first front emission holes;
    a light source module entirely located in the accommodation space, the light source module including at least one light source of the light source module;
    a plurality of first front optical fibers having first ends directly connected to the plurality of first front emission holes and second ends optically coupled to the at least one light source;
    at least one outer illumination sensor located in the accommodation space; and
    a plurality of outer optical fibers having first ends directly connected to a plurality of outer emission holes provided at the at least one other side of the outer frame and second ends optically coupled to the at least one outer illumination sensor,
    wherein the plurality of first front optical fibers are different from the plurality of outer optical fibers.

2. The light emitting sign apparatus of claim 1, wherein the front panel further includes a plurality of second front emission holes,
    wherein the light emitting sign apparatus further comprises:

a front illumination sensor located in the accommodation space; and a plurality of second front optical fibers having first ends connected to the plurality of second front emission holes and second ends optically coupled to the front illumination sensor.

3. The light emitting sign apparatus of claim 1, wherein the light source module further includes a front illumination sensor, wherein the front illumination sensor is optically coupled to the second ends of the first front optical fibers.

4. The light emitting sign apparatus of claim 3, wherein a frame of the light source module has a barrel shape, wherein the second ends of the first front optical fibers constitute a binding part as a concentrated bundle to be fitted into the frame of the light source module, wherein the front illumination sensor and the at least one light source are disposed to face the binding part.

5. The light emitting sign apparatus of claim 3, wherein a sensing period of the front illumination sensor and an emission period of the at least one light source do not temporally overlap with each other.

6. The light emitting sign apparatus of claim 2, wherein the at least one outer illumination sensor includes a rear illumination sensor, an upper illumination sensor, a left illumination sensor, and a right illumination sensor, wherein the plurality of outer emission holes include rear emission holes, upper emission holes, left emission holes, and right emission holes, wherein the plurality of outer optical fibers include a plurality of rear optical fibers, a plurality of upper optical fibers, a plurality of left optical fibers, and a plurality of right optical fibers, wherein the plurality of rear optical fibers have first ends connected to the rear emission holes and second ends optically coupled to the rear illumination sensor, wherein the plurality of upper optical fibers have first ends connected to the upper emission holes and second ends optically coupled to the upper illumination sensor, wherein the plurality of left optical fibers have first ends connected to the left emission holes and second ends optically coupled to the left illumination sensor, wherein the plurality of right optical fibers have first ends connected to the right emission holes and second ends optically coupled to the right illumination sensor.

7. The light emitting sign apparatus of claim 6, further comprising controller configured to estimate a position or time of the sun according to illumination intensity measured by each of the front illumination sensor, the rear illumination sensor, the upper illumination sensor, the left illumination sensor, and the right illumination sensor, and determine a light emitting luminance of the at least one light source according to the estimated position or time of the sun.

8. The light emitting sign apparatus of claim 7, further comprising:

a solar cell having a positive electrode connected to a first node;

a first main battery configured to receive charge power from the first node or supply discharge power to a second node through charge/discharge switches; and a second main battery configured to receive charge power from the first node or supply discharge power to the second node through charge/discharge switches.

9. The light emitting sign apparatus of claim 8, further comprising:

a first sub-battery configured to receive charge power from the first node or supply discharge power to a third node through charge/discharge switches;

a second sub-battery configured to receive charge power from the first node or supply discharge power to the third node through charge/discharge switches; and a DC-DC converter located between the second node and the third node.

10. The light emitting sign apparatus of claim 9, further comprising:

a first diode having an anode connected to the first node and a cathode connected to a side of the charge/discharge switches of the first main battery;

a second diode having an anode connected to the side of the charge/discharge switches of the first main battery and a cathode connected to the second node;

a third diode having an anode connected to the first node and a cathode connected to a side of the charge/discharge switches of the second main battery; and a fourth diode having an anode connected to the side of the charge/discharge switches of the second main battery and a cathode connected to the second node.

11. The light emitting sign apparatus of claim 10, further comprising:

a fifth diode having an anode connected to the first node and a cathode connected to a side of the charge/discharge switches of the first sub-battery;

a sixth diode having an anode connected to the side of the charge/discharge switches of the first sub-battery and a cathode connected to the third node;

a seventh diode having an anode connected to the first node and a cathode connected to a side of the charge/discharge switches of the second sub-battery; and an eighth diode having an anode connected to the side of the charge/discharge switches of the second sub-battery and a cathode connected to the third node.

12. The light emitting sign apparatus of claim 3, wherein the at least one outer illumination sensor includes a rear illumination sensor, an upper illumination sensor, a left illumination sensor, and a right illumination sensor, wherein the outer emission holes include a plurality of rear emission holes, a plurality of upper emission holes, a plurality of left emission holes, and a plurality of right emission holes, wherein the plurality of outer optical fibers include a plurality of rear optical fibers, a plurality of upper optical fibers, a plurality of left optical fibers, and a plurality of right optical fibers, wherein the plurality of rear optical fibers have first ends connected to the plurality of rear emission holes and second ends optically coupled to the rear illumination sensor, wherein the plurality of upper optical fibers have first ends connected to the plurality of upper emission holes and second ends optically coupled to the upper illumination sensor, wherein the plurality of left optical fibers have first ends connected to the plurality of left emission holes and second ends optically coupled to the left illumination sensor, wherein the plurality of right optical fibers have first ends connected to the plurality of right emission holes and second ends optically coupled to the right illumination sensor.

13. The light emitting sign apparatus of claim 12, further comprising a controller configured to estimate a position or time of the sun according to illumination intensity measured by each of the front illumination sensor, the rear illumination sensor, the upper illumination sensor, the left illumination sensor, and the right illumination sensor, and determine a light emitting luminance of the at least one light source according to the estimated position or time of the sun.

14. The light emitting sign apparatus of claim 13, further comprising:
- a solar cell having a positive electrode connected to a first node;
- a first main battery configured to receive charge power from the first node or supply discharge power to a second node through charge/discharge switches; and
- a second main battery configured to receive charge power from the first node or supply discharge power to the second node through charge/discharge switches.

15. The light emitting sign apparatus of claim 14, further comprising:
- a first sub-battery configured to receive charge power from the first node or supply discharge power to a third node through charge/discharge switches;
- a second sub-battery configured to receive charge power from the first node or supply discharge power to the third node through charge/discharge switches; and
- a DC-DC converter located between the second node and the third node.

16. The light emitting sign apparatus of claim 15, further comprising:
- a first diode having an anode connected to the first node and a cathode connected to a side of the charge/discharge switches of the first main battery;
- a second diode having an anode connected to the side of the charge/discharge switches of the first main battery and a cathode connected to the second node;
- a third diode having an anode connected to the first node and a cathode connected to a side of the charge/discharge switches of the second main battery; and
- a fourth diode having an anode connected to the side of the charge/discharge switches of the second main battery and a cathode connected to the second node.

17. The light emitting sign apparatus of claim 16, further comprising:
- a fifth diode having an anode connected to the first node and a cathode connected to a side of the charge/discharge switches of the first sub-battery;
- a sixth diode having an anode connected to the side of the charge/discharge switches of the first sub-battery and a cathode connected to the third node;
- a seventh diode having an anode connected to the first node and a cathode connected to a side of the charge/discharge switches of the second sub-battery; and
- an eighth diode having an anode connected to the side of the charge/discharge switches of the second sub-battery and a cathode connected to the third node.

\* \* \* \* \*